(12) United States Patent
Zhu et al.

(10) Patent No.: US 9,991,771 B2
(45) Date of Patent: Jun. 5, 2018

(54) ACTIVE CONTROL SYSTEM FOR A VARIABLE ELECTROMOTIVE-FORCE GENERATOR WITH APPLICATIONS TO WIND TURBINES, SHIPS, AND HYBRID VEHICLES

(71) Applicant: University of Maryland, Baltimore County, Baltimore, MD (US)

(72) Inventors: Weidong Zhu, Ellicott City, MD (US); Navid Goudarzi, Baltimore, MD (US); Xuefeng Wang, Halethorpe, MD (US)

(73) Assignee: THE UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days. days.

(21) Appl. No.: 14/534,112

(22) Filed: Nov. 5, 2014

(65) Prior Publication Data

US 2015/0214821 A1  Jul. 30, 2015

Related U.S. Application Data

(60) Provisional application No. 61/899,969, filed on Nov. 5, 2013.

(51) Int. Cl.
| | | |
|---|---|---|
| H02P 3/00 | (2006.01) |
| H02P 9/06 | (2006.01) |
| H02P 15/00 | (2006.01) |
| H02K 21/02 | (2006.01) |
| F03D 7/02 | (2006.01) |
| H02K 21/24 | (2006.01) |
| B60L 15/20 | (2006.01) |
| H02K 5/16 | (2006.01) |
| H02K 7/08 | (2006.01) |
| H02P 9/00 | (2006.01) |
| H02K 7/18 | (2006.01) |

(52) U.S. Cl.
CPC ........ *H02K 21/024* (2013.01); *B60L 15/2009* (2013.01); *F03D 7/0272* (2013.01); *H02K 21/24* (2013.01); *B60L 2220/50* (2013.01); *B60L 2240/421* (2013.01); *B60L 2240/423* (2013.01); *B60L 2270/145* (2013.01); *H02K 7/1838* (2013.01); *H02K 2201/03* (2013.01); *H02K 2213/09* (2013.01); *H02P 9/00* (2013.01); *Y02E 10/723* (2013.01); *Y02T 10/641* (2013.01); *Y02T 10/645* (2013.01); *Y02T 10/7275* (2013.01)

(58) Field of Classification Search
CPC ... H02K 21/022; H02K 21/023; H02K 21/024
USPC .................... 322/11; 310/90; 60/491; 29/596
See application file for complete search history.

(56) References Cited

U.S. PATENT DOCUMENTS

| | | | | | |
|---|---|---|---|---|---|
| 2,484,197 | A | * | 10/1949 | Veldhuis | F03D 9/002 290/44 |
| 5,627,419 | A | * | 5/1997 | Miller | H02K 7/025 290/38 A |
| 5,655,369 | A | * | 8/1997 | Folsom | F04C 14/20 60/414 |
| 5,655,370 | A | * | 8/1997 | Folsom | F04C 14/20 60/487 |

(Continued)

*Primary Examiner* — Pedro J Cuevas
(74) *Attorney, Agent, or Firm* — Juneau & Mitchell; Todd L. Juneau

(57) ABSTRACT

This invention relates to an active control system for a variable electromotive-force generator (VEG) for use in wind turbines, ships, hybrid vehicles, and related applications.

6 Claims, 15 Drawing Sheets

(56) References Cited

U.S. PATENT DOCUMENTS

| | | | | |
|---|---|---|---|---|
| 5,657,629 | A * | 8/1997 | Folsom | F04C 14/20 60/487 |
| 5,763,977 | A * | 6/1998 | Shimasaki | H02K 21/024 310/162 |
| 6,137,203 | A * | 10/2000 | Jermakian | H02K 1/2793 310/191 |
| 6,348,751 | B1 * | 2/2002 | Jermakian | H02K 1/2793 310/156.35 |
| 7,508,151 | B2 * | 3/2009 | Hashimoto | H02K 15/16 318/159 |
| 7,586,304 | B2 * | 9/2009 | Hashimoto | H02K 15/16 318/653 |
| 7,866,027 | B2 * | 1/2011 | Hashimoto | H02K 15/028 29/596 |
| 8,004,223 | B2 * | 8/2011 | Yagi | B60L 11/1803 318/268 |
| 8,294,404 | B2 * | 10/2012 | Stiesdal | H02K 1/12 310/90 |
| 8,446,060 | B1 * | 5/2013 | Lugg | H02K 21/024 310/103 |
| 9,825,510 | B2 * | 11/2017 | Coldwate | H02K 11/20 |
| 2002/0117861 | A1 * | 8/2002 | Kim | F03D 7/0272 290/54 |
| 2003/0057792 | A1 * | 3/2003 | Yang | H02K 7/12 310/191 |
| 2007/0096581 | A1 * | 5/2007 | Zepp | H02K 21/024 310/191 |
| 2007/0130752 | A1 * | 6/2007 | Hashimoto | H02K 15/028 29/596 |
| 2007/0130753 | A1 * | 6/2007 | Hashimoto | H02K 15/16 29/596 |
| 2007/0278979 | A1 * | 12/2007 | Hashimoto | H02K 15/16 318/538 |
| 2008/0197730 | A1 * | 8/2008 | Himmelmann | B60K 6/365 310/83 |
| 2008/0246430 | A1 * | 10/2008 | Yanagihara | B60K 7/0007 318/799 |
| 2009/0212728 | A1 * | 8/2009 | Yagi | B60L 11/1803 318/437 |
| 2010/0072706 | A1 * | 3/2010 | Schmitz | F16J 15/3436 277/301 |
| 2010/0264768 | A1 * | 10/2010 | Alfermann | H02K 21/027 310/90 |
| 2013/0009507 | A1 * | 1/2013 | Do | H02K 21/024 310/156.24 |
| 2014/0097719 | A1 * | 4/2014 | Seo | H02K 21/024 310/208 |
| 2015/0171721 | A1 * | 6/2015 | Seo | H02K 21/027 310/90 |
| 2017/0170713 | A1 * | 6/2017 | Shamoto | H02K 7/025 |
| 2017/0302138 | A1 * | 10/2017 | Coldwate | H02K 11/20 |

* cited by examiner

ACTIVE CONTROL SYSTEM FOR A VARIABLE ELECTROMOTIVE-FORCE GENERATOR WITH APPLICATIONS TO WIND TURBINES, SHIPS, AND HYBRID VEHICLES

STATEMENT REGARDING FEDERALLY SPONSORED RESEARCH OR DEVELOPMENT

Federal government funds were used in researching or developing this invention, and specifically National Science Foundation Award CMMI-1335397.

CROSS REFERENCE TO RELATED APPLICATIONS

Not applicable.

NAMES OF PARTIES TO A JOINT RESEARCH AGREEMENT

None

BACKGROUND

Field of the Invention

This invention relates to an active control system for a variable electromotive-force generator (VEG) for use in wind turbines, ships, hybrid vehicles, and related applications.

Background of the Invention

Conventional energy sources including coal, petroleum, and natural gas are the majority of energy sources for residential and commercial applications, their environmental impacts and sustainability issues have been drawing more concerns in recent decades. New technologies that use different types of renewable energies are necessary to address these issues.

Wind turbines convert the kinetic energy in wind into mechanical power, and generators convert the mechanical power into electricity. Generators with more reliable, efficient, and compact designs are needed in wind turbines to maximize the wind power capture and produce a higher quality output power. Hybrid electric vehicles have been introduced to reduce the primary energy consumption and pollutant emissions in transportations systems, but torque loss and energy efficiencies are also needed in these technologies.

Accordingly, there is a need for an improved variable electromotive-force generator having an active control system to address the needs in the art.

BRIEF SUMMARY OF THE INVENTION

In one preferred embodiment, the invention is a method of adjusting the output power in a variable electromotive-force generator, comprising the steps of: adjusting the overlap between a rotor and a stator of the variable electromotive-force generator using an active control system, the active control system operatively associated with a variable electromotive-force generator and the active control system comprising a motion control interface, an actuator controlled by the motion control interface for adjusting the overlap between the rotor and the stator based on the output power at different input speeds, and a data acquisition interface that monitors the output power of the variable electromotive-force generator, wherein decreasing the overlap between the rotor and the stator of the variable electromotive-force generator increases the rotor speed and the generator output power decreases, and wherein increasing the overlap between the rotor and the stator of the variable electromotive-force generator decreases the rotor speed and the generator output power increases.

In another preferred embodiment, the invention provides a method of adjusting the output power in a variable electromotive-force generator, further comprising wherein the variable electromotive-force generator is part of a wind turbine and the active control system is a continuous control active control system that is programmed to provide improved efficiency and expanded operation range wherein at low input speeds the overlap between the rotor and the stator is adjusted to minimize the torque drag and keep the generator rotor spinning, and wherein at high input speeds the overlap between the rotor and the stator is adjusted for generation of maximum power.

In another preferred embodiment, the invention provides a method of adjusting the output power in a variable electromotive-force generator, further comprising wherein the variable electromotive-force generator is part of a hybrid vehicle application and the active control system is a discrete control active control system that is programmed to provide increased generation of electricity upon deceleration and reduced torque upon acceleration wherein upon vehicle deceleration the overlap between the rotor and the stator of the generator is increased to generate electricity that can be stored in batteries or ultra-capacitors, and wherein upon vehicle acceleration the overlap between the rotor and the stator of the generator is adjusted to a minimum to reduce the torque drag.

In yet another preferred embodiment, the invention provides a system for adjusting the output power in a variable electromotive-force generator, comprising: an active control system for adjusting the overlap between a rotor and a stator of the variable electromotive-force generator, the active control system operatively associated with a variable electromotive-force generator, and the active control system comprising a motion control interface, an actuator controlled by the motion control interface for adjusting the overlap between the rotor and the stator based on the output power at different input speeds, and a data acquisition interface that monitors the output power of the variable electromotive-force generator, wherein decreasing the overlap between the rotor and the stator of the variable electromotive-force generator increases the rotor speed and the generator output power decreases, and wherein increasing the overlap between the rotor and the stator of the variable electromotive-force generator decreases the rotor speed and the generator output power increases.

In another preferred embodiment, the invention provides a system for adjusting the output power in a variable electromotive-force generator, further comprising wherein the variable electromotive-force generator is part of a wind turbine and the active control system is a continuous control active control system that is programmed to provide improved efficiency and expanded operation range wherein at low input speeds the overlap between the rotor and the stator is adjusted to minimize the torque drag and keep the generator rotor spinning, and wherein at high input speeds the overlap between the rotor and the stator is adjusted for generation of maximum power.

In another preferred embodiment, the invention provides a system for adjusting the output power in a variable electromotive-force generator, further comprising wherein the variable electromotive-force generator is part of a hybrid vehicle application and the active control system is a discrete control active control system that is programmed to provide increased generation of electricity upon deceleration and reduced torque upon acceleration wherein upon vehicle deceleration the overlap between the rotor and the stator of the generator is increased to generate electricity that can be stored in batteries or ultra-capacitors, and wherein upon vehicle acceleration the overlap between the rotor and the stator of the generator is adjusted to a minimum to reduce the torque drag.

DETAILED DESCRIPTION OF THE INVENTION

An active control system was developed to adjust the overlap between the rotor and the stator of a modified generator, called a variable electromotive-force generator (VEG), based on the desired output power at different input speeds. A novel test stand for a VEG prototype was designed and fabricated, including a 700 W electric motor as the prime mover, a 12 V DC synchronous generator with an adjustable overlap between the rotor and the stator, and a stepper motor as an actuator for the active control system. The national instrument LabVIEW platforms were used to perform the feedback control algorithm. The performance of the VEG with an active control system to adjust the overlap between the rotor and the stator is provided herein both theoretically and experimentally. The control algorithm is expressed in discrete and continuous models to cover a broad range of applications of a VEG in wind turbines, ships, hybrid vehicles, and so on. The two goals of observing the increase in the generator rotor speed by decreasing the overlap between the rotor and the stator, and adjusting the overlap between the rotor and the stator based on a desired and optimum output voltage, were investigated in designing and implementing the active control system for the VEG.

An improved variable electromotive-force generator (VEG) [1-4] with an active control system was developed to improve the efficiency and expand the operational range of a regular generator in wind turbines, ships, hybrid vehicles, and so on; this improvement was achieved by adjusting the total magnetic loss in a generator.

Definitions

Figure 1:
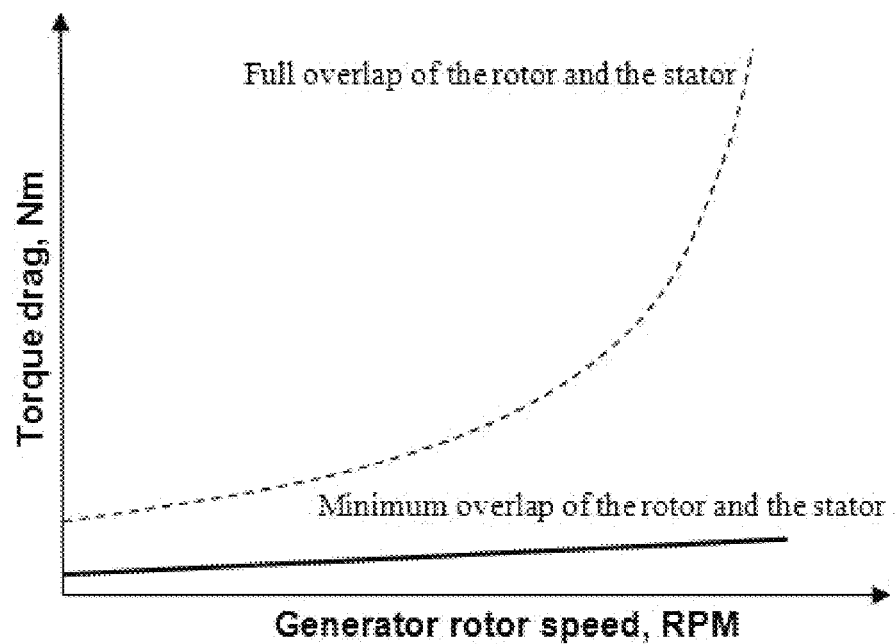
FIG. 1 is a graph and shows the torque drag versus the generator rotor speed in a permanent magnet motor in two different situations with the minimum and full overlaps between the rotor and the stator.

A Rotor Swept Area—$m^2$
B Magnetic Flux Density—$Wb/m^2$
$C_P$ Power Coefficient
ds Change in the Magnetic Field Length—m
E Electromotive Force—V
F Factor to condition the normalized output power
I Current—Amp
$l_f$ Width of the Magnetic Field—m
N Number of Coils
$P_g$ Generator Output Power—W
$P_r$ Rotor Output Power—W
R Resistance—Ohm
U Wind Speed—m/s
Y Pulse Width Modulation Signal Value
$\eta_{mech}$ Mechanical Efficiency
ω Rotational Speed—rad/s
Φ Magnetic Flux—Wb
ρ Air Density—$kg/m^3$
λ Tip Speed Ratio The total magnetic loss in an electric machine has two main components: eddy current loss and hysteresis loss [5]. Eddy current loss can be minimized by choosing magnetic cores with lower electrical conductivity or by using laminations; hysteresis loss can be minimized by reducing the maximum magnetic flux density and the frequency, and choosing materials with lower permeability such as permalloys [6]. FIG. 1 shows the torque drag versus the generator rotor speed in a permanent magnet motor [7]. While at the full overlap between the rotor and the stator, the torque drag due to bearing friction and magnetic loss increases rapidly with the rotor speed; at the minimum overlap between the rotor and the stator, the torque drag has a very slow increase that is just due to the bearing friction. Hence, by changing the overlap between the rotor and the stator, the induced magnetic torque loss of a generator can be adjusted, which is the main goal in developing the VEG.

Wind turbines convert the kinetic energy in wind into mechanical power, and generators convert the mechanical power into electricity. Generators with more reliable, efficient, and compact designs should be used in wind turbines to maximize the wind power capture and produce a higher quality output power [8]. A VEG can be used in wind turbines with different drivetrain types [9], and a continuous model for the active control system can be employed to adjust the overlap between the rotor and the stator. At low input speeds, the overlap between the rotor and the stator can be adjusted to minimize the torque drag and keep the generator rotor spinning, and it can be increased as the speed increases to generate the maximum power; hence, an improved efficiency and an expanded operational range can be obtained.

A VEG can be used in hybrid vehicles with different generator types, and a discrete model for the active control system can be employed to adjust the overlap between the rotor and the stator. As the vehicle decelerates, the overlap between the rotor and the stator of the generator increases to generate electricity that can be stored in batteries or ultra-capacitors; as the vehicle accelerates, the overlap between the rotor and the stator of the generator goes back to its minimum to reduce the torque drag, as shown in FIG. 1; the stored energy will be released and a vehicle can accelerate more smoothly and efficiently. Zepp et al. [7] have studied a brushless permanent magnet electric machine that improves the fuel efficiency of a hybrid vehicle at low speeds by eliminating induced magnetic torque loss in the generator. Recently, Allison Transmission Inc. [10] announced its H3000 hybrid-propulsion system for transit buses that includes a VEG feature; an increase of 25-40% in miles per gallon and a similar percentage of reduction in $CO_2$ emission have been achieved in medium to heavy duty vehicles [11].

Provided herein is an active control system for a VEG that is developed to automatically perform the overlap adjustment between the rotor and the stator based on the desired output power. Discrete and continuous control models for different applications were theoretically and experimentally studied, and the mathematical model of the VEG was checked against experimental measurements taken from a test stand developed. In one non-limiting example, an output power with less than 5% fluctuations for discrete and continuous models, at different input speeds lower than 150 rpm, was achieved in the experimental setup.

Methodology

Figure 2:
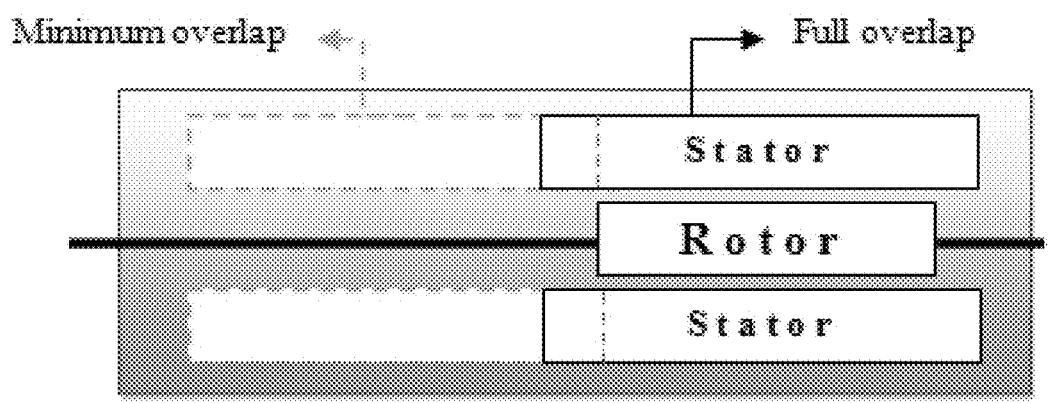
FIG. 2 is a schematic of a VEG with a movable stator.

The fundamental operation of a synchronous generator or other electric machines can be understood by applying the Faraday's law of induction on a conductor moving in a static magnetic field [12]:

$$\text{Emf} = NB\frac{dA}{dt} = NBl\frac{ds}{dt} = NBl_f v \tag{1}$$

where is the induced voltage or the electromotive force that is proportional to the time varying flux enhanced by the circuit; lf and are the width and the change in the length of the moving surface area, respectively; and v is the velocity of the moving conductors. In a constant magnetic field and for a constant velocity of the moving conductors, the electromotive force can be changed by changing lf in the magnetic field. This approach is taken here by keeping the rotor position fixed, and adjusting the overlap between the rotor and the stator by moving the stator relative to the rotor. In effect, the difference in the overlap can be thought of as having different generators with a varying length and a similar width in series. FIG. 2 shows the schematic of a VEG with a fixed rotor and a movable stator; the overlap between the rotor and the stator is adjusted, when the wind speed falls in the range between the reduced cut-in speed of the modified wind turbine and the cut-in speed of the current wind turbine, to smooth the decreasing rate of the output power of the modified generator compared with that of the current generator. The full overlap between the rotor and the stator occurs when the wind speed is slightly higher than the current cut-in speed and lower than the cut-out speed to produce the maximum power in this range.

Active Control System of a VEG

Figure 3:
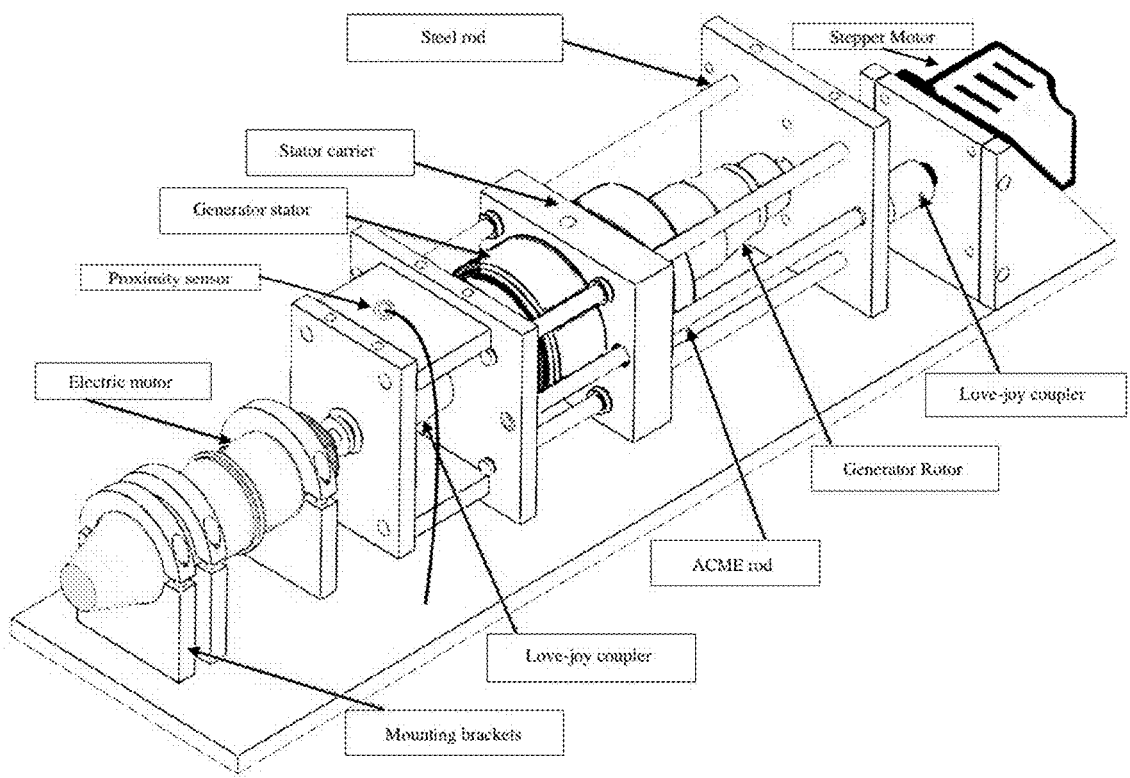
FIG. 3 is a photographic representation of the VEG test stand used herein.

FIG. 3 shows a VEG test stand with its main components, including an electric motor, a modified generator with an adjustable overlap between the rotor and the stator, a proximity sensor, an ACME rod, and a control unit. A 700 W electric motor is used as the prime mover, and its rotational speed is precisely controlled by a pulse-width-modulation (PWM) signal provided by a digital Arduino Uno microcontroller. An IFI Robotic-Victor 885 speed controller that operates at the 24 V nominal voltage is wired in series between the power supply and the motor; it processes the output PWM signal of the Arduino Uno microcontroller. The PWM signal is used to control the transistors in the speed controller, allowing the voltage to flow through the controller. The correlation between the PWM signal and the rotational speed of the rotor in RPM can be obtained by determining the rotational speed of the rotor by means of a proximity sensor that is mounted on the top of the coupler between the output electric motor and input generator shafts. A $5^{th}$ order polynomial is derived to convert the PWM signal values to the rotor RPM values:

$$\text{RPM}=(1.91E{-}08)Y^5-(1.24E{-}04)Y^4+(3.21E{-}01)Y^3- \\ (4.16E{+}02)Y^2+(2.69E{+}05)Y-(6.96E{+}07) \tag{2}$$

where Y is the PWM signal value. A high precision, low cost stepper motor, with an output torque of 465 oz-in (3.284 Nm), fixed to a mounting plate and connected to an ACME threaded rod via a love joy coupler, is used to control the position of the stator carrier at different rotational speeds (FIG. 3).

Figure 4:
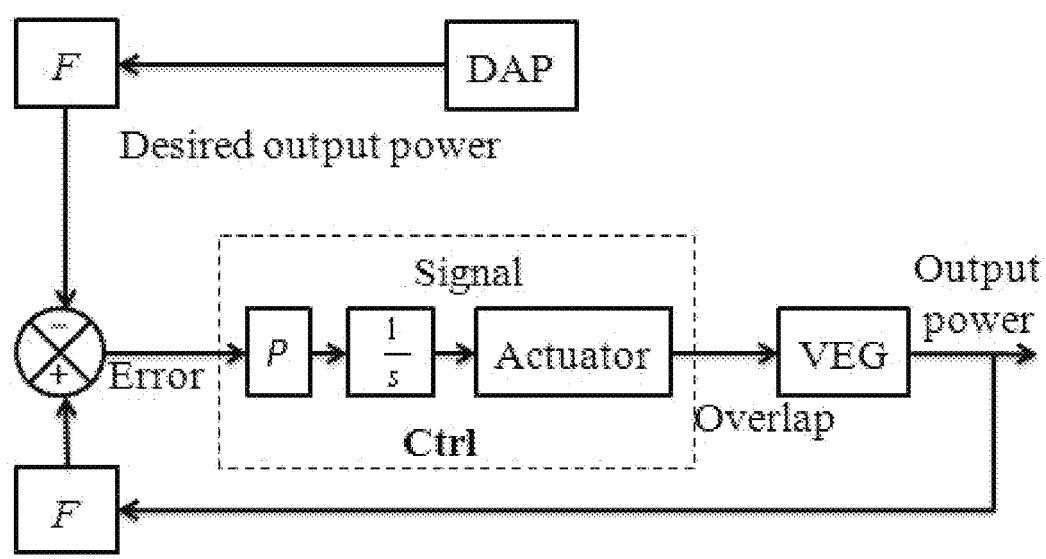
FIG. 4 is a flow chart and shows active control system for the VEG with two main parts: the DAP and the Ctrl part.

In order to automatically control the VEG to generate a desired output power, the overlap between the rotor and the stator can be adjusted by an active control system that has two main parts: the data acquisition part (DAP), and the control (Ctrl) part, as shown in FIG. 4. The DAP is performed by using a precise proximity sensor to record the rotational speed, as shown in FIG. 3, and calculate the corresponding desired output power that will be generated by the VEG. The Ctrl part that includes a feedback control system is to make the VEG to generate the desired output power by adjusting the overlap between the rotor and the stator. The desired output power calculated from the DAP is the set point for the Ctrl part; the output power of the VEG is the feedback, and the difference between the desired and real output powers multiplied by a factor F, which will be discussed in the results, is the error between the real output power of the VEG and the desired one calculated in the DAP.

The adjustment procedure will be applied based on either a fixed desired output voltage that will be given to the control system or an optimum output voltage that can be obtained for a specific generator. The control law for the Ctrl part is performed using national instruments LabVIEW system design platforms including the SCB-68 data acquisition interface to monitor the output voltage of the generator, and a stepper motor as the actuator of the control system that is controlled by the UMI-7772 motion control interface. A proportional-integral (PI) controller with a constant P=250 converts the error to a signal that is transmitted to the stepper motor control unit to change the output power by adjusting the overlap between the rotor and the stator. The more accurate the output power reading of the DAP, the more robust and reliable the control system to achieve a faster and more accurate overlap adjustment. Note that higher accuracy in reading data and designing the control system is required, especially at lower input speeds and for a smaller overlap between the rotor and the stator.

As a laboratory example that can be extrapolated to commercial applications according to the level of skill in the art, the control law for the Ctrl part is implemented using a software platform, e.g. for an experimental value the National Instrument (NI) LabVIEW platform was used, to design the control logic (FIG. 5), the SCB-68 data acquisition interface to monitor the output voltage of the generator, and the stepper motor as the actuator that is controlled by the UMI-7772 motion control interface. A proportional-integral (PI) controller with a proportional constant P=250 and a unit integral constant converts the error to a signal that is transmitted to the stepper motor controller to change the output power of the generator by adjusting the overlap between the rotor and the stator. More accurate output power reading in the DAP results in a faster and more precise overlap adjustment. This higher accuracy is required in reading the data and designing the control system, especially at low rotor speeds and for small overlap ratios between the rotor and the stator.

Overlap adjustment parameterization will be developed based on the rotor speed of the generator. For a specific application of the VEG and the optimum output power of the generator, the desired output power can be discretely or continuously changed. For a hybrid vehicle application, there are discrete desired output powers at specific speeds for a required maximum and a minimum electromagnetic torque as the vehicle decelerates and accelerates, respectively. For a wind turbine application with a continuously varied wind speed, an optimum output power at any rotor speed is required by continuously adjusting the overlap between the rotor and the stator.

Figure 6:
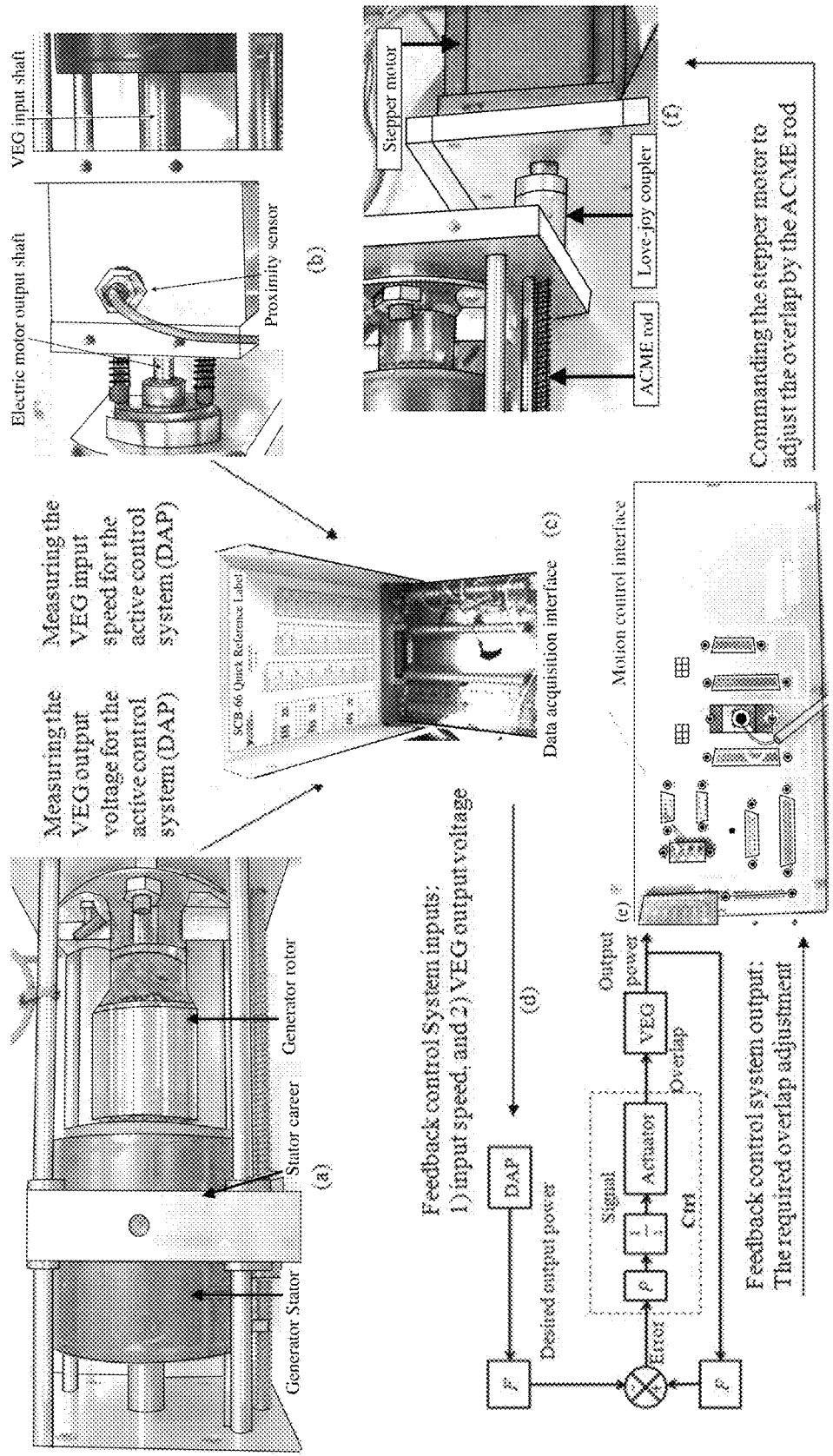
FIG. 6 is a photographic representation showing the Hardware for the test procedure: (a) the VEG, (b) the proximity sensor, (c) the data acquisition interface, (d) the control system, (e) the motion control interface, and (f) the stepper motor.

Referring now to FIG. 6, a complete assembly of a prototype is provided. The test procedure for acquiring the generator output voltage data for a complete assembly is outlined below:

1. Run the electric motor: this step simulates the actual arbitrary input power to the VEG that can be either a hybrid vehicle speed or the input wind speed of a wind turbine.

2. Measure the VEG rotor speed: the actual output speed of the electric motor or the rotor speed of the VEG is measured by a precise proximity sensor attached to the top of the love-joy coupler between the electric motor and the VEG shafts. Connect the other end of the proximity sensor to the NI SCB-68 data acquisition interface shown in FIG. 6.

3. Connect large 6 kΩ resistors to terminals of the stator and the armature of the generator to eliminate high current values.

4. Connect the stepper motor to the NI UMI-7772 motion control interface (FIG. 6).

5. Set a desired output power as either a fixed or an optimum value in the LabVIEW software, and run the active control system to adjust the overlap, as shown by the data processing module in FIG. 5.

6. Obtain the generator output voltage and speed through the data acquisition module in the LabVIEW software (FIG. 5), and monitor the generator input voltage and current by a digital multimeter.

Figure 5:
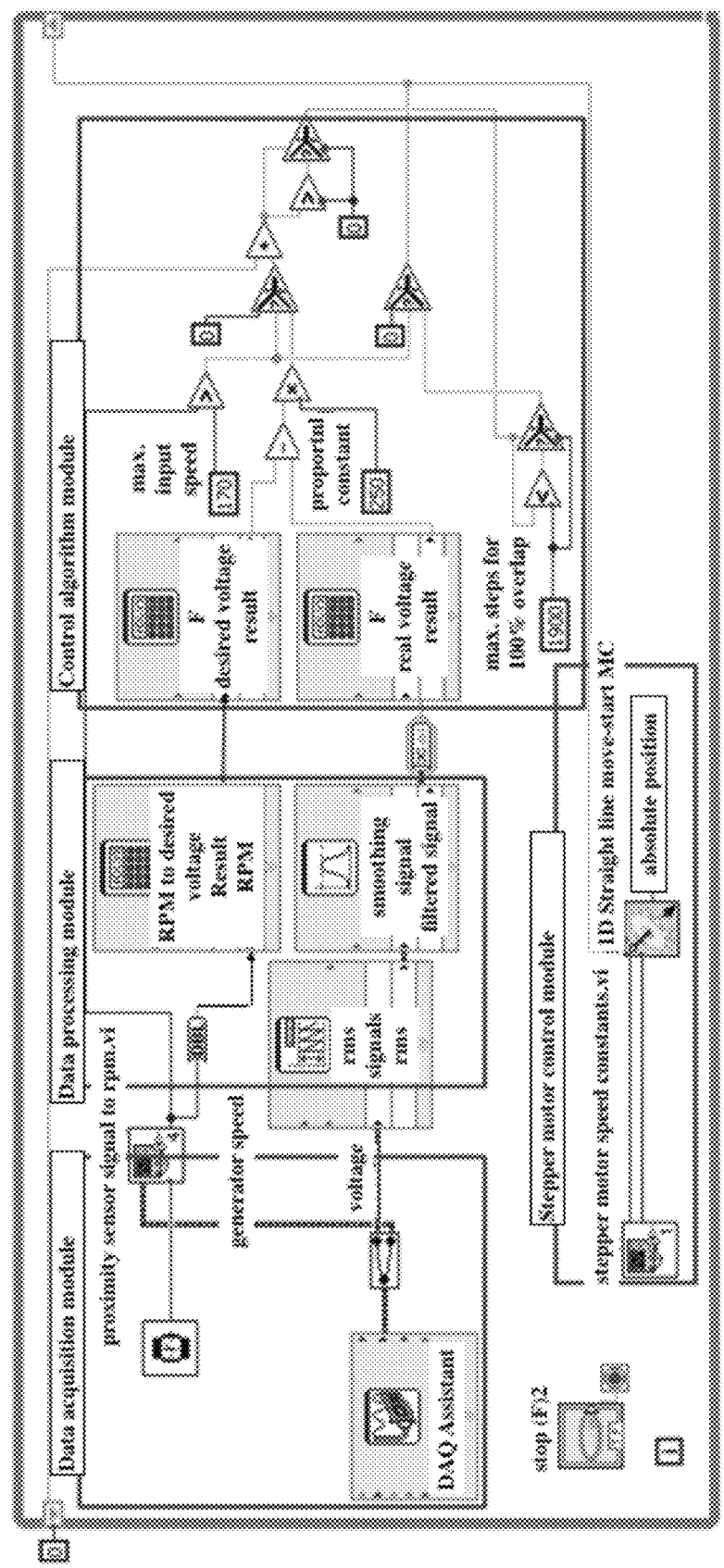
FIG. 5 is a NI LabVIEW block diagram for the active control system of the VEG.

7. Since the output load of the generator is a constant resistor, the root mean square (RMS) value of the generator output voltage is proportional to the output power in a sampling cycle. Hence, the RMS value in a sampling cycle is calculated in the data processing module to be the real output voltage, and four consecutive RMS values are averaged to smooth the output voltage (FIG. 5). The desired output voltage is obtained using the generator speed in the data acquisition module.

8. The smoothed real output voltage and the desired output voltage are sent to the control algorithm module and the signal for actuating the stepper motor is generated in the stepper motor control module (FIG. 5).

9. Repeat the test for a range of PWM signals that cover a desired range of rotor speeds.

10. Unplug the Arduino microcontroller and turn off the system.

Results

Impact of the VEG on the Generator Rotor Speed

Figure 7:
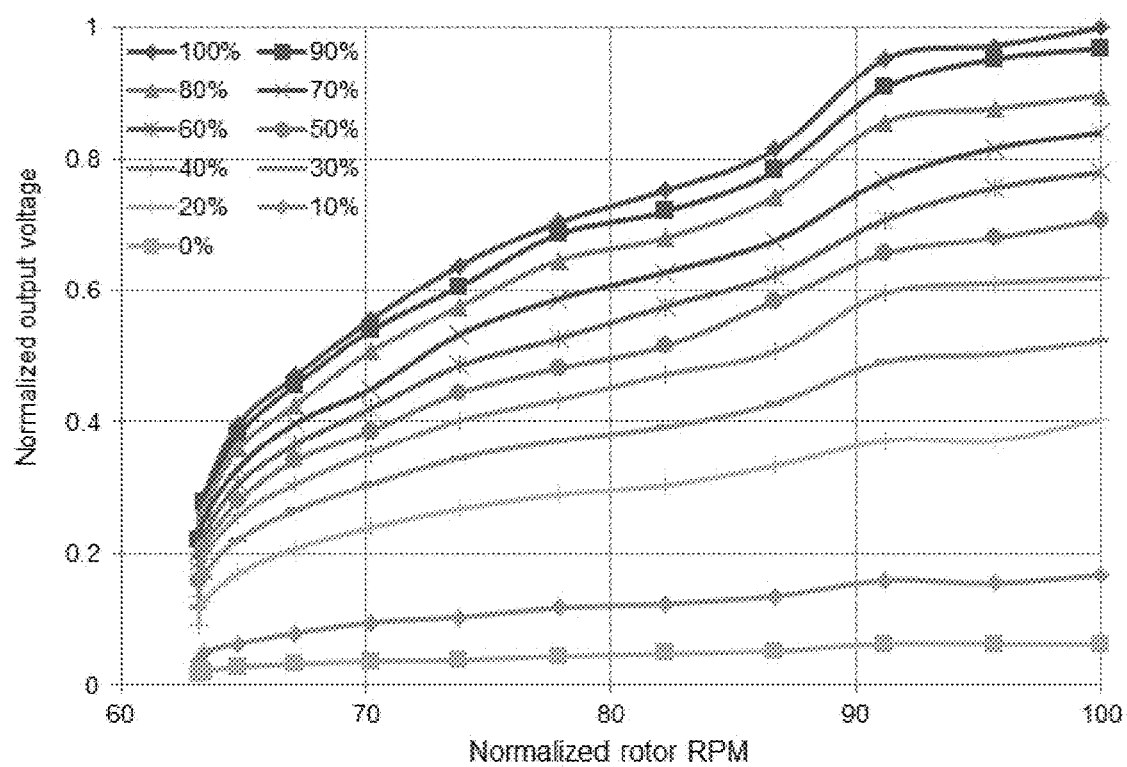
FIG. 7 is a plotted graph and shows the normalized output voltages for different overlap ratios at different rotational speeds.

At the steady state with constant input speeds, the normalized output voltage versus the normalized rotor speed is shown in FIG. 7 for different overlap ratios; the output voltage decreases with the overlap. The first goal here is to determine whether a modified generator with an adjustable overlap between the rotor and the stator can generate electricity at input powers lower than the one that a regular generator starts working Having a modified generator operating under a lower input power than that of a regular one in a wind turbine means the modified generator can start working at a lower wind speed than the current cut-in speed of the regular one. A multi-variable $7^{th}$ order polynomial is developed using the results in FIG. 7, which defines the output voltage of the generator as a function of the rotor speed and the overlap between the rotor and the stator:

$$V=\psi(op)\varphi(\text{RPM}) \qquad (3)$$

where $\psi$ and $\varphi$ are functions of the overlap (op) and the rotor RPM value, respectively:

$$\psi=C_1 op^3+C_2 op^2+C_3 op+C_4 \qquad (4)$$

$$\varphi(\text{RPM})=k_1 \text{RPM}^4+k_2 \text{RPM}^3+k_3 \text{RPM}^2+k_4 \text{RPM}+k_5 \qquad (5)$$

in which the coefficients are
$C_1$=0.8972 $C_2$=−1.7216 $C_3$=1.1130 $C_4$=−0.0924
$k_1$=−0.0386 $k_2$=1.0 $k_3$=−9.6408
$k_4$=41.3116 $k_5$=−65.8427

Figure 8:
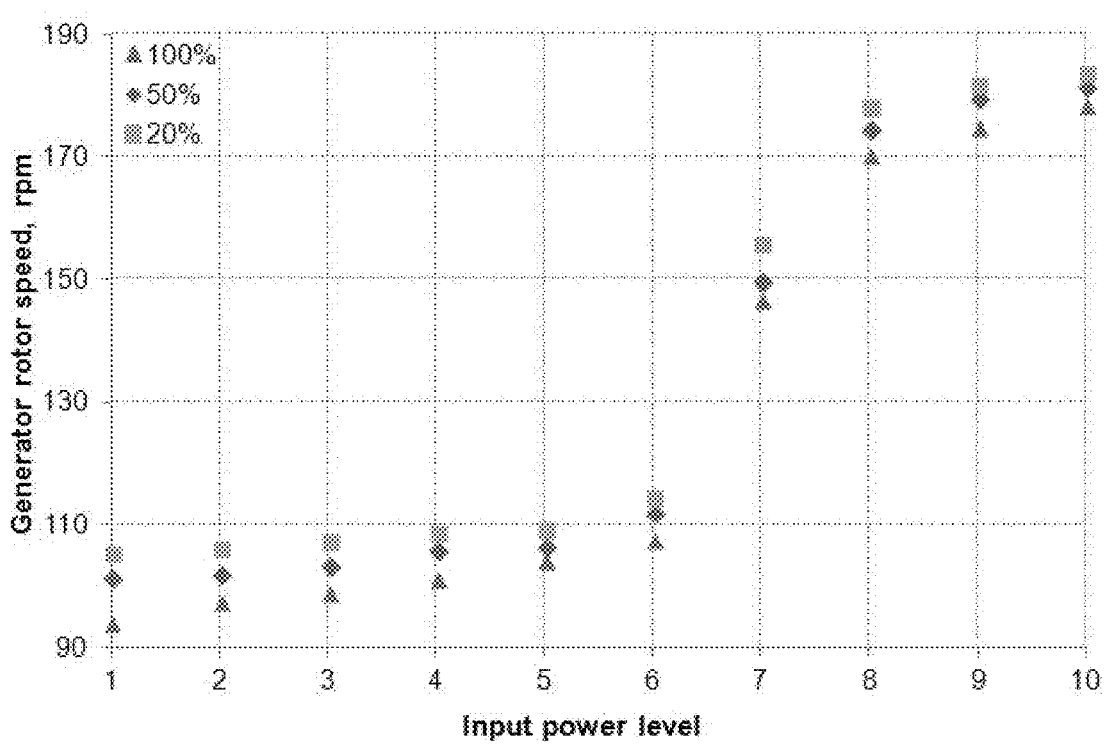
FIG. 8 is a graph and shows the generator rotor speed variations for different input power levels at different overlap ratios.

At any input power, the generator rotor speed and output power are measured. FIG. 8 shows the generator rotor speed variations at different input power levels due to decreasing the overlap between the rotor and the stator. The input powers at the speed range of zero to 150 rpm, are indicated in a range from 1 to 10 where 1 is the minimum input power at which the modified generator rotor starts spinning; 6 and 7 are the current start-up power of the regular generator, and 8 to 10 are the powers at which the generator works as a regular generator following its power curve. The input power levels are obtained by the PWM signals of an Arduino Uno microcontroller; a higher input signal gives a larger input power. As it is seen in FIG. 8, at a constant input power, by decreasing the overlap between the rotor and the stator, the generator rotor speed is increasing. By decreasing the overlap between the rotor and the stator of the studied modified generator, the rotor speed had an up to 12% increase. Furthermore, three regions with specific speed ranges are observed in FIG. 8. The first region includes very low input speeds lower than 110 rpm; the second region is a transition between the low and high input speeds; and the third region represents the input rotational speeds larger than 150 RPM. The focus of the VEG will be on the first two regions where a generator starts generating power.

Figure 9:
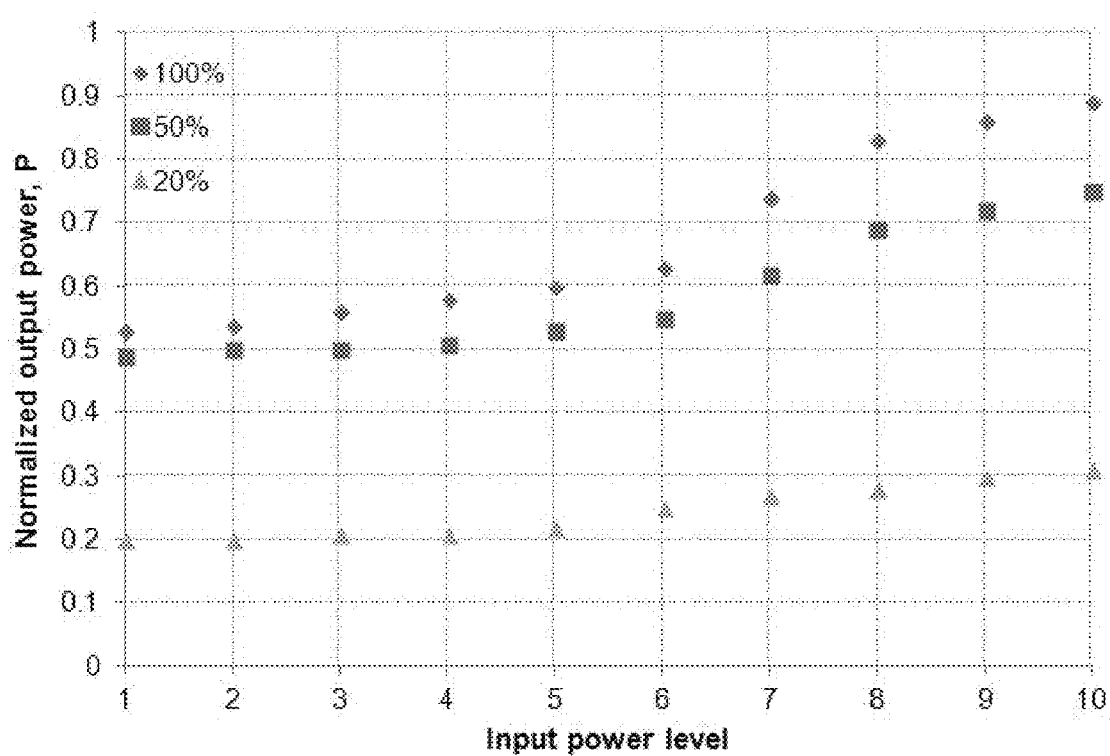
FIG. 9 is a graph and shows the normalized output power variations for different input power levels at different overlap ratios.

FIG. 9 shows the changes in the normalized output power for different input power levels provided by an Arduino Uno microcontroller. The same three regions described on FIG. 8 are observed in FIG. 9 too; there is a minimum output power region from the 1$^{st}$ to the 5$^{th}$ input power levels obtained by the VEG feature; then there is a jump in the generator output power from the 6$^{th}$ to the 7$^{th}$ level at which the input rotational speed changes from 110 to 140 rpm; and the third region represents the regular generator output powers. While up to 12% increase in the generator rotor speed at 20% overlap between the rotor and the stator is achieved, there is a significant reduction of up to 65% in the generator output power.

Higher overlap ratios (more than 50%) between the rotor and the stator will result in higher output powers at lower rotational speeds, and lower overlap ratios (less than 50%) between the rotor and the stator will result in lower output powers at higher rotational speeds. It is desired to obtain an optimum overlap ratio at different input speeds lower than 150 rpm at which the modified generator have its maximum output power and its rotor spins at its maximum rotational speed. The experimental results show that the optimum path from the minimum rotational speed to the 150 rpm is achieved when the overlap between the rotor and the stator is changing from 50% to 100%. While the modified generator continues working at lower input speeds, lower than that of the regular one, it also generates power. Thus, the VEG feature can be employed in onshore/offshore wind turbines to expand the operational range and increase the captured wind power.

Validation of the Mathematical Model

The mathematical model is checked against experimental measurements obtained from the test stand developed. The changes in the generator parameters at different overlap ratios and input powers have been expressed as a polynomial of degree n [8]:

$$\frac{A_i}{A_{min}} = \frac{P_i}{P_{min}} (a_{i,1} \ldots a_{i,n}) \begin{bmatrix} Y^n \\ \vdots \\ 1 \end{bmatrix} = \frac{P_i}{P_{min}} k_n \quad (6)$$

where $A_i, P_i$ and $A_{min}, P_{min}$ are the input power and area of the effective moving surfaces at any wind speed and the current minimum speed, respectively; the second and third terms in the middle expression are expressed as a polynomial $k_n$ of degree n on the right-hand side, in which n and the coefficients $a_{i,j}$ depend on the type of the generator and the test conditions; and Y depends on the generator specifications and the input rotational speed of the generator. The polynomial $k_n$ can be obtained through a set of tests for a specific range of the input power and a specific overlap ratio, and modified for other input powers and overlap ratios. Three overlap ratios of 100%, 50%, and 20% at rotational speeds lower than 150 rpm are discussed below.

Figure 10:
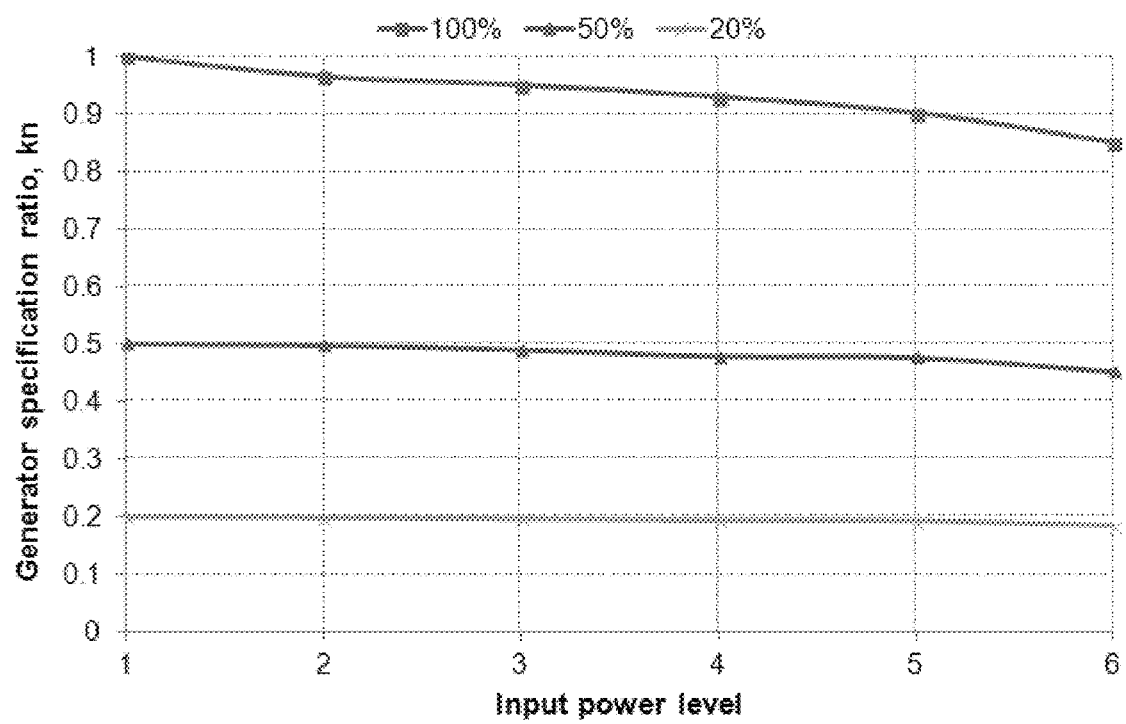
FIG. 10 is a graph and shows the generator specification ratio $k_n$ for different input power levels and overlap ratios.

For different input powers and rotational speeds lower than 150 rpm at 100%, 50%, and 20% overlaps between the rotor and the stator, $k_n$ has been obtained from experimental results by third, second, and first order polynomials:

$$k(100\%) = -0.0021X^3 + 0.0196X^2 - 0.0767X + 1.0588 \quad (7)$$

$$k(50\%) = -0.00115X^2 + 0.0016X + 0.5 \quad (8)$$

$$k(20\%) = -0.0029X + 0.2042 \quad (9)$$

where X is the input power level. FIG. 10 shows the $k_n$ curves for different input powers and overlap ratios. It is observed that as the input power and overlap ratio increase, the changes in the $k_n$ values increase as well. Also, it is seen that the changes in the generator specifications decrease with the overlap between the rotor and the stator.

For any input power at rotational speeds lower than 150 rpm, substituting Eqs. (7)-(9) into Eq. (6), one can find the overlap ratio of 1, 0.5, and 0.2, respectively. Table 1 shows the comparison of the overlap ratios obtained from the mathematical model versus the experimental tests for different input power levels at rotational speeds lower than 150 rpm. It should be noted that the values in Table 1 are calculated with the rotational speed measured with an accuracy of rpm. There is a very good compatibility between the mathematical model and experimental test results for different input powers; the maximum errors for the 100%, 50%, and 20% overlap ratios do not exceed from 2%. As the input rotational speed reaches the start-up value of the regular generator, a modified generator will work as a regular one with a full overlap between the rotor and the stator and follows the regular generator power curve. In this study, the modified generator works with the full overlap between the rotor and the stator, when the input rotational speed reaches 150 rpm.

TABLE 1

Comparison of the overlap ratios obtained from the mathematical model and the ones used in the experimental tests.

| Input power level | Experiment | Mathematical model |
|---|---|---|
| 100% overlap | | |
| 1 | 1 | 0.9996 |
| 2 | 1 | 1.0020 |
| 3 | 1 | 0.9979 |
| 4 | 1 | 1.0011 |
| 5 | 1 | 1.0004 |
| 6 | 1 | 0.9996 |
| 50% overlap | | |
| 1 | 0.5 | 0.4998 |
| 2 | 0.5 | 0.4994 |
| 3 | 0.5 | 0.5105 |
| 4 | 0.5 | 0.5040 |
| 5 | 0.5 | 0.4939 |
| 6 | 0.5 | 0.4809 |
| 20% overlap | | |
| 1 | 0.2 | 0.2013 |
| 2 | 0.2 | 0.1984 |
| 3 | 0.2 | 0.1955 |
| 4 | 0.2 | 0.1926 |
| 5 | 0.2 | 0.1897 |
| 6 | 0.2 | 0.1809 |

Active Control System

Figure 11:
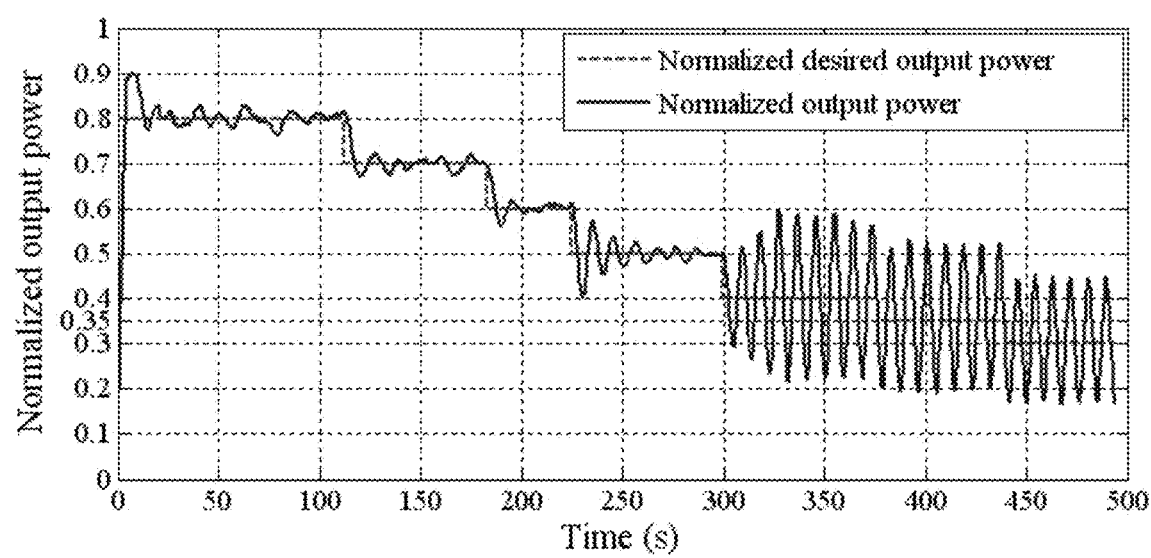
FIG. 11 is a line graph and shows output power of the VEG which is stable when the normalized desired output power is larger than 0.5, and unstable when the normalized desired output power is less than 0.4.
Figure 12:
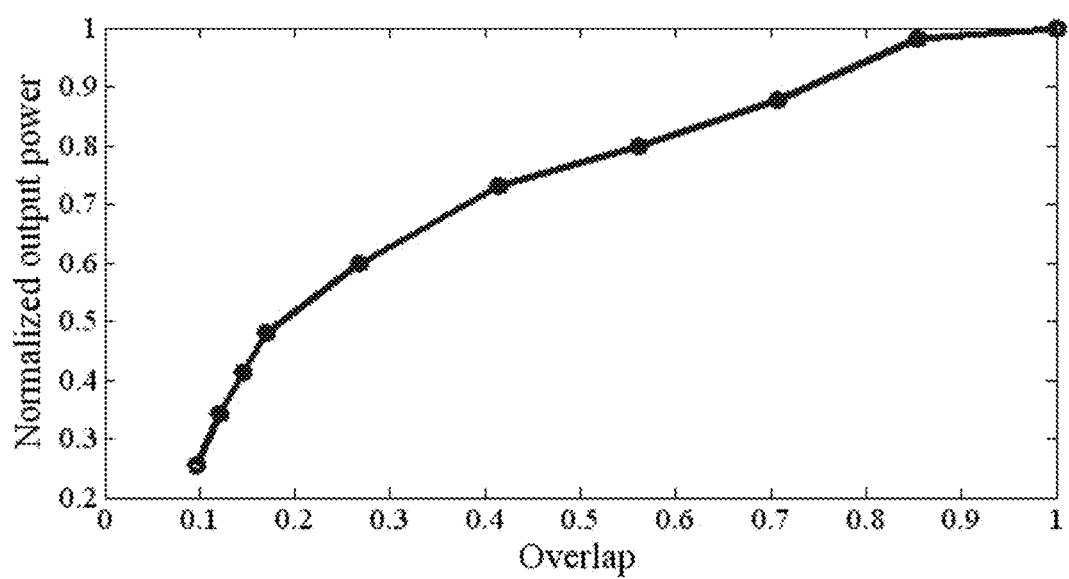
FIG. 12 is a line graph and shows the normalized output power of the VEG versus the overlap.

FIG. 11 shows the generator output power by changing the overlap between the rotor and the stator of a modified generator. The control is unstable at small overlaps. When the normalized desired output power is 0.5 and the overlap is about 75% of the full overlap, the normalized output power of the VEG is stable after a transient. The small oscillations after the transients are introduced by the VEG when the regular generator is modified to allow the overlap adjustment. When the normalized desired output power is less than 0.4 and the overlap is less than 20% of the full overlap, the normalized output power of the VEG is unstable. To correct the output power error in FIG. 11, a correction factor F is defined to condition the desired and real output powers. Since the relation between the output power and the overlap is nonlinear, as shown in FIG. 12 where the normalized output power is the output power divided by that at the full overlap between the rotor and the stator, the slope of the factor F changes with the desired or real output power. If the overlap gets smaller, the change in the output power with the overlap will be steeper which means that the output power at a small overlap is more sensitive to the overlap change than that at a large overlap. In order to make the control system stable at every overlap, the slope of the factor F should be changed with the overlap or the normalized desired output power. A variable factor F, which is a function of the normalized desired or real output power $P_g$, is fitted using the data in FIG. 12:

$$F = -2.16 P_g^2 + 0.6 P_g + 1.93 \qquad (10)$$

Figure 13:
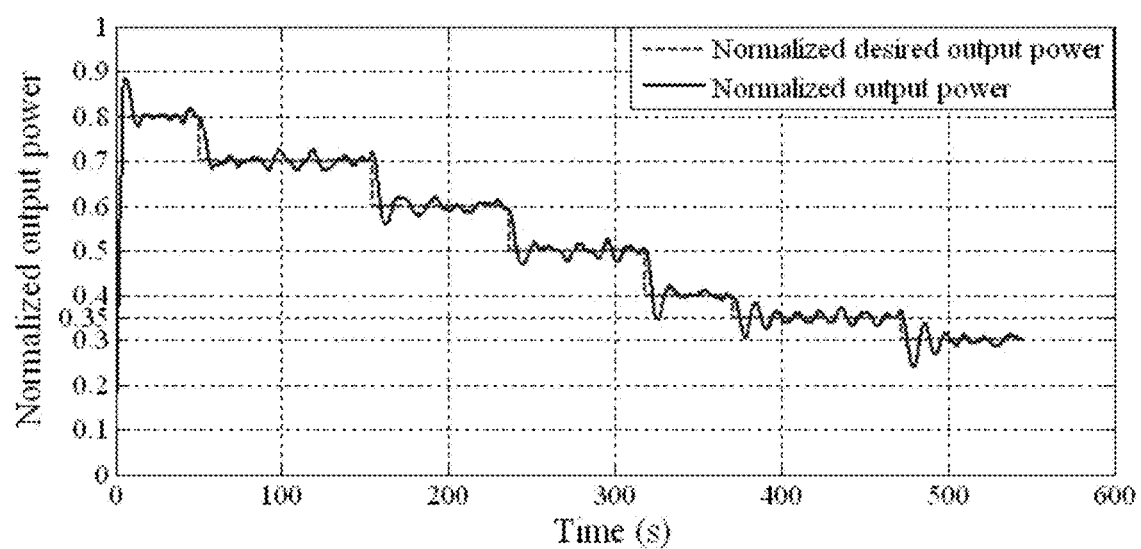
FIG. 13 is a line graph and shows the output power of the VEG with the variable factor in Eq. (10), which is stable at every overlap ratio.

Equation (10) shows that when the normalized desired or actual output power is smaller, the slope of the factor is smaller so that the sensitivity of the output power with respect to the overlap is smaller at a small overlap, and the output of the VEG is stable at every overlap ratio, as shown in FIG. 13. Equation (11) can be used for different overlaps and rotational speeds. Hence the fixed or optimum output power of the VEG can be achieved based on the input power and rotational speed. The stability of the fixed or optimum output power can be improved by the correction factor.

Figure 14:
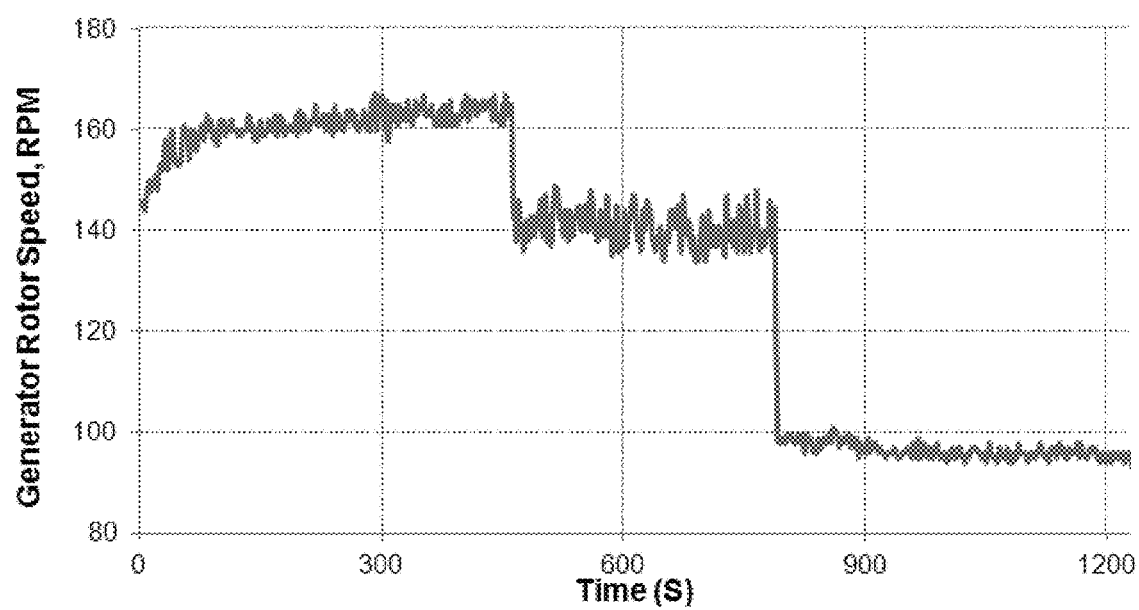
FIG. 14 is a graph and shows the generator rotor speed variations with time using the active control module.

An active control system is developed to obtain either a fixed or an optimum VEG output power. While the fixed output power can be chosen arbitrarily, the optimum output power is obtained under two considerations: the VEG generates the maximum output power, and it works at the maximum rotational speeds at lower input speeds. The optimum control module is implemented for low rotational speeds lower than 150 RPM (i.e., the $7^{th}$ input level) before jumping to higher rotational speeds and output power values. The optimum generator output power can be obtained by a logarithmic relation between the input speed and the output power:

$$P_g = 0.7631 \ln(\omega) - 3.0204 \qquad (11)$$

where $P_g$ is the generator output power, and $\omega$ is the rotational speed in RPM. The equivalent voltage with respect to the generator power will be the input to the PI controller module to adjust the overlap between the rotor and the stator. FIG. 14 shows the changes in the generator rotor speed as the control law is applied to the VEG. The speed fluctuations in the range from 130 to 150 RPM have been controlled based on the optimum output power having an approximately constant optimum value of 140.90 RPM in the transition region between the very low rotational speeds and low rotational speeds. The generator rotor speed at low input rotational speeds, lower than 120 RPM, is being controlled under two considerations of generating the maximum output power and having the generator working continuously at the maximum optimum rotational speeds. The generator rotor will spin approximately at an average speed of 96.25 RPM in this low speed range.

Figure 15:
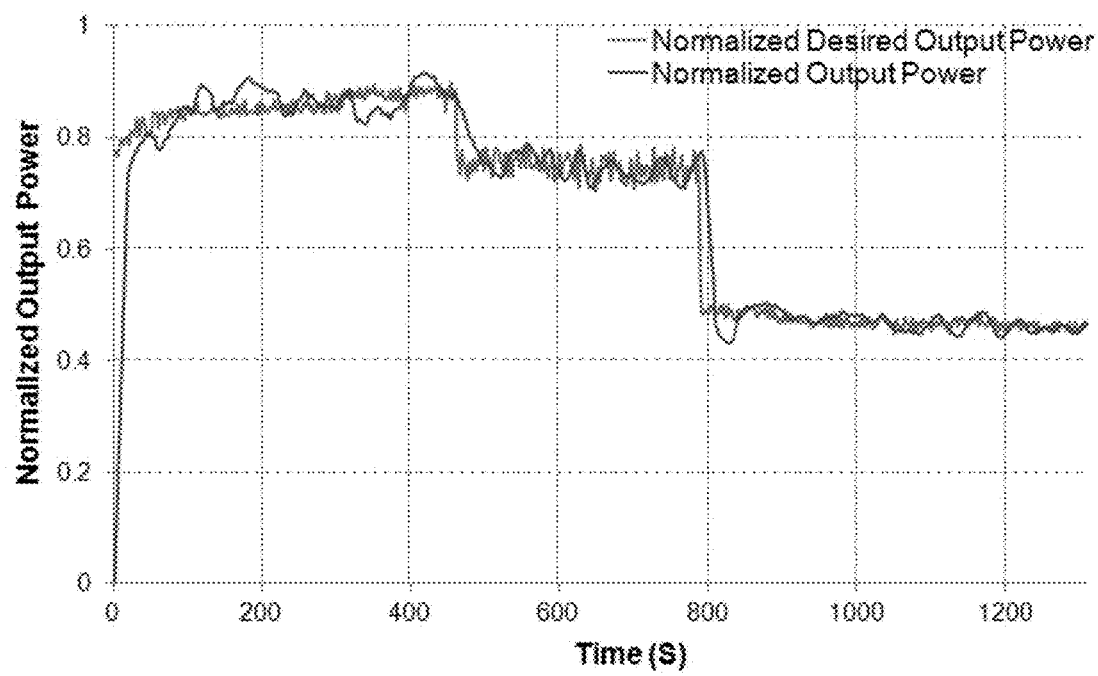
FIG. 15 is a graph and shows the actual and desired normalized output power variations with time using the active control module.

FIG. 15 shows the actual and desired output voltage values of the VEG at different input speeds using the active control Module together with the mathematical modeling. The actual output voltage values start from zero and the desired output voltage values, which are calculated from Eq. (11) with the input speeds start from 0.78. The actual output voltage is controlled to be close to the desired output value with low fluctuations by applying the control law. While the input speed from the electric motor (prime mover) is larger than 150 RPM, the VEG works as a regular generator with a full overlap between the rotor and the stator, which results in generating the maximum output voltage and power values, as shown in FIG. 15 in the time range from 0 to 450 seconds. After the high speed region, there is the transition region where the desired output power of the generator has a large decreasing rate due to the drop of the input speed. The actual output voltage is controlled by adjusting the overlap between the rotor and the stator to have the optimum value. The normalized output voltage of the VEG will have an average value of 0.75 with 5% fluctuations around the average rate. The last region in FIG. 15 represents the normalized actual and desired output power values of the VEG at very low input speeds. The actual output power in this range has an average of 0.47 with 3% fluctuations around the average rate.

CONCLUSION

An active control system for a novel VEG prototype as provided herein adjusts the overlap between the rotor and the stator based on the output power at different input speeds. It was observed that by decreasing the overlap between the rotor and the stator of a generator, the generator rotor speed increases, and the generator output power decreases. While at 20% overlap between the rotor and the stator of the studied 12 V DC synchronous generator, a 12% increase in the minimum rotational speed is achieved, the generator output power is decreased up to 65%. For a wind turbine application, to make the generator running at very low input speeds and generate a maximum output power, a continuous control model was developed and an optimum generator output power based on the experimental results together with the mathematical equations was obtained. As the input speed increases from the minimum required speed in the modified generator to that in the regular one, the optimum output power will be closer to that at the full overlap between the rotor and the stator. For a hybrid vehicle application, a discrete control model is used at which the minimum and maximum overlap between the rotor and the stator is adjusted when the vehicle accelerates and decelerates, respectively. The studied generator output power had a maximum of 3% fluctuations at input speeds lower than 150 rpm where the active control system was implemented. Very low fluctuations of the output power and short response time of the control system to the changes in the input speed make the VEG a good option for onshore/offshore wind turbine applications in wind farms with high wind speed fluctuations throughout a year or low annual mean wind speed. Also, employing a VEG in hybrid vehicles can improve the fuel efficiency and enhance the reliability.

REFERENCES

Goudarzi, N., 2011, "Aerodynamic & Electromagnetic Modeling & Analysis of a Variable Torque Generator for Wind Turbine Applications," M. S. Thesis, Department of Mechanical Engineering, University of Maryland, Baltimore County, Baltimore, Md., USA.

Goudarzi, N., and Zhu, W. D., 2012, "Aerodynamic and Electromagnetic Analysis of a Variable Electromotive-Force Generator for a Wind Turbine," presented at the ASME International Mechanical Engineering Congress & Exposition, Houston, Tex., USA.

Zhu, W. D., Goudarzi, N., Wang, X. F., and Kendrick, P., 2012, "Development of a Variable Electromotive-force Generator for a Wind Turbine," Proceedings of the ASME International Mechanical Engineering Congress & Exposition, Houston, Tex., USA.

Kendrick, P., 2012, "Development and Analysis of a Variable Electromotive Force Generator for Use in Wind Turbine Applications," M. S. Thesis, Department of Mechanical Engineering, University of Maryland, Baltimore County, Baltimore, Md., USA.

Nasar, S. A., and Boldea, I., 1990, "Electric Machines, Steady-State Operation," Hemisphere Publishing Corp., Ch. 2-4, pp. 19-160.

Bishop, R. S., 2008, "Mechatronic Systems, Sensors, and Actuators," 2nd ed., CRC press, Ch. 21.

Zepp, L. P., 2011, "Brushless permanent magnet motor/generator with axial rotor decoupling to eliminate magnet induced torque losses," U.S. Pat. No. 7,863,789.

Goudarzi, N., Zhu, W. D., and Bahari, H., 2012, "Wind energy conversion: the potential of a novel ducted turbine for residential and commercial applications," The ASME International Mechanical Engineering Congress & Exposition, Houston, Tex., USA, 2012.

Goudarzi, N., and Zhu, W. D., 2013, "A review on the development of the wind turbine generators across the world," Int. J. Dynam. Control, 1 (2), pp. 192-202.

Automotive World, 2013, "Allison Transmission to Unveil Fully-Automatic Hybrid for Commercial Vehicles," information on: http://www.automotiveworld.com/news-releases/allison-transmission-to-unveil-fully-automatic-hybrid-for-commercial-vehicles/

Variable Torque Motors LLC., 2009, "Transit Applications of the Variable Torque Motors Parallel Hybrid Drive System," Fort Wayne, Ind., pp. 1-13.

Wentworth, S. M., 2005, "Fundamentals of electromagnetic with engineering applications," John Wiley & Sons, Inc., UK.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A method of adjusting the output power in a variable electromotive-force generator, comprising the steps of:
    adjusting overlap between a rotor and a moving stator that moves axially relative to the rotor of the variable electromotive-force generator, said adjusting based on an error value derived from a difference between an actual output shaft rotational speed and a desired output power,
    wherein the actual output shaft rotational speed is measured using a precise proximity sensor mounted on a coupler between an electric motor of the variable electromotive-force generator and an input/output shaft section of the variable electromotive-force generator;
    wherein the precise proximity sensor is connected to a data acquisition interface;
    wherein a stepper motor is connected to an acme rod, the acme rod is connected to an axially moving stator carrier of the variable electromotive-force generator, the stepper motor having a motion control interface;
    wherein an active control system is connected to the motion control interface, and the data acquisition interface, for adjusting overlap between a rotor and an axially moving stator of the variable electromotive-force generator, the active control system having a fixed desired output voltage setting and an optimum output voltage setting, the active control system;
    wherein a data acquisition module is in communication with the precise proximity sensor and transmits a precise proximity sensor rpm signal to a data processing module, and the data acquisition module is in communication with the data acquisition interface and transmits a generator output voltage signal to the data processing module;
    wherein a control algorithm module is in communication with the data processing module and receives the precise proximity sensor rpm signal and the generator output voltage signal, wherein the control algorithm module calculates a signal difference between the precise proximity sensor rpm signal and the generator output voltage signal, the control algorithm module contains software code instruction to multiply the signal difference by an error factor F,
    wherein the control algorithm module generates an adjustment signal based on the error factor F and transmits the adjustment signal to the motion control interface connected to the stepper motor, and wherein the motion control interface adjusts the overlap between the rotor and the axially moving stator based on the adjustment signal received from the control algorithm module.

2. The method of claim 1, further comprising wherein the variable electromotive-force generator is part of a wind turbine and the active control system is a continuous control active control system that is programmed to provide improved efficiency and expanded operation range wherein at low input speeds the overlap between the rotor and the axially moving stator is adjusted to minimize torque drag and keep the generator rotor spinning, and wherein at high input speeds the overlap between the rotor and the axially moving stator is adjusted for generation of maximum power.

3. The method of claim 1, further comprising wherein the variable electromotive-force generator is part of a hybrid vehicle application and the active control system is a discrete control active control system that is programmed to provide increased generation of electricity upon deceleration and reduced torque upon acceleration wherein upon vehicle deceleration the overlap between the rotor and the axially moving stator of the generator is increased to generate electricity that can be stored in batteries or ultra-capacitors, and wherein upon vehicle acceleration the overlap between the rotor and the axially moving stator of the generator is adjusted to a minimum to reduce torque drag.

4. A system for adjusting output power in a variable electromotive-force generator, comprising:
    a precise proximity sensor mounted on a coupler between an electric motor of the variable electromotive-force generator and an input/output shaft section of the variable electromotive-force generator;
    the precise proximity sensor connected to a data acquisition interface;
    a stepper motor connected to an acme rod, the acme rod connected to an axially moving stator carrier of the variable electromotive-force generator, the stepper motor having a motion control interface;
    an active control system for adjusting overlap between a rotor and an axially moving stator of the variable electromotive-force generator, the active control system having a fixed desired output voltage setting and an optimum output voltage setting, the active control system connected to the motion control interface, and the active control system connected to the data acquisition interface;
    a data acquisition module is in communication with the precise proximity sensor and transmits a precise proximity sensor rpm signal to a data processing module, the data acquisition module is in communication with the data acquisition interface and transmits a generator output voltage signal to the data processing module;

a control algorithm module is in communication with the data processing module and receives the precise proximity sensor rpm signal and the generator output voltage signal, the control algorithm module calculates a signal difference between the precise proximity sensor rpm signal and the generator output voltage signal, the control algorithm module contains software code instruction to multiply the signal difference by an error factor F, the control algorithm module generates an adjustment signal based on the error factor F and transmits the adjustment signal to the motion control interface connected to the stepper motor, the motion control interface adjusting the overlap between the rotor and the axially moving stator based on the adjustment signal received from the control algorithm module.

5. The system of claim 4, further comprising wherein the variable electromotive-force generator is part of a wind turbine and the active control system is a continuous control active control system that is programmed to provide improved efficiency and expanded operation range wherein at low input speeds the overlap between the rotor and the axially moving stator is adjusted to minimize torque drag and keep the generator rotor spinning, and wherein at high input speeds the overlap between the rotor and the axially moving stator is adjusted for generation of maximum power.

6. The system of claim 4, further comprising wherein the variable electromotive-force generator is part of a hybrid vehicle application and the active control system is a discrete control active control system that is programmed to provide increased generation of electricity upon deceleration and reduced torque upon acceleration wherein upon vehicle deceleration the overlap between the rotor and the axially moving stator of the generator is increased to generate electricity that can be stored in batteries or ultra-capacitors, and wherein upon vehicle acceleration the overlap between the rotor and the axially moving stator of the generator is adjusted to a minimum to reduce torque drag.

* * * * *

UNITED STATES PATENT AND TRADEMARK OFFICE
CERTIFICATE OF CORRECTION

Page 1 of 1

PATENT NO. : 9,991,771 B2
APPLICATION NO. : 14/534112
DATED : June 5, 2018
INVENTOR(S) : Zhu et al.

It is certified that error appears in the above-identified patent and that said Letters Patent is hereby corrected as shown below:

On the Title Page

Item (72) Inventor is corrected to read:
-- Weidong Zhu, Ellicott City, MD;
Navid Goudarzi, Baltimore, MD;
Xuefeng Wang, Halethorpe, MD;
Philip Kendrick, Fort Worth, TX --.

Signed and Sealed this
Fourteenth Day of August, 2018

Andrei Iancu
*Director of the United States Patent and Trademark Office*